US012717328B2

(12) United States Patent
Lam et al.

(10) Patent No.: US 12,717,328 B2
(45) Date of Patent: Aug. 25, 2026

(54) NAVIGATION SYSTEM FOR A VISUALLY IMPAIRED USER AND A METHOD OF NAVIGATING A VISUALLY IMPAIRED USER

(71) Applicant: Logistics and Supply Chain MultiTech R&D Centre Limited, Pok Fu Lam (HK)

(72) Inventors: ZiQiao Lam, Pok Fu Lam (HK); Kam Lai Wong, Pok Fu Lam (HK); King Sau Wong, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 273 days.

(21) Appl. No.: 18/475,461

(22) Filed: Sep. 27, 2023

(65) Prior Publication Data

US 2025/0103047 A1 Mar. 27, 2025

(51) Int. Cl.
*G05D 1/00* (2024.01)
*G01C 21/36* (2006.01)

(52) U.S. Cl.
CPC ....... *G05D 1/0214* (2013.01); *G01C 21/3652* (2013.01); *G05D 1/0236* (2013.01); *G05D 1/0246* (2013.01); *G05D 1/0272* (2013.01); *G05D 1/0274* (2013.01)

(58) Field of Classification Search
CPC .. G05D 1/0214; G05D 1/0236; G05D 1/0246; G05D 1/0272; G05D 1/0274; G05D 1/228; G05D 2111/17; G05D 1/242; G05D 1/622; G05D 2105/315; G05D 2109/10; G05D 2111/54; G01C 21/3652
See application file for complete search history.

(56) References Cited

U.S. PATENT DOCUMENTS

2018/0321045 A1* 11/2018 Belt ........................ A61H 3/061
2021/0252392 A1* 8/2021 Stevens ................... G06F 3/016

FOREIGN PATENT DOCUMENTS

CN 215960995 U 3/2022
JP 2015084129 A * 4/2015

OTHER PUBLICATIONS

English translation of CN-215960995-U (Year: 2025).*
English Translation of JP-2015084129-A (Year: 2026).*

* cited by examiner

*Primary Examiner* — Scott A Browne
*Assistant Examiner* — Shahira Baajour
(74) *Attorney, Agent, or Firm* — Renner, Kenner, Greive, Bobak, Taylor & Weber

(57) ABSTRACT

A system and a method for a navigation system for a visually impaired user includes a navigation module arranged to derive a navigational path from a starting position to a predetermined destination; a guiding vehicle arranged to guide the visually impaired user towards the predetermined destination based on the derived navigational path whereby the movement is arranged to indicate a navigation guidance to the visually impaired user; wherein the navigation module is further arranged to adjust the navigational path of the guiding vehicle in response to the detection of an obstacle during the navigation of the guiding vehicle so as to avoid the detected obstacle whilst following the navigational path.

18 Claims, 6 Drawing Sheets

NAVIGATION SYSTEM FOR A VISUALLY IMPAIRED USER AND A METHOD OF NAVIGATING A VISUALLY IMPAIRED USER

TECHNICAL FIELD

The invention relates to a navigation system for a user and a method of navigating a user, although not exclusively, to a visually impaired user and a method of navigating a visually impaired user.

BACKGROUND

Traditional Road Guidance Tools for visually impaired persons include canes and guide dogs to assist with providing guidance for the navigation of visually impaired persons. This kind of tools may improve the navigation of visually impaired persons, but may be difficult to use, or in the case of guide dogs, costly to train and maintain.

SUMMARY OF THE INVENTION

In accordance with a first aspect of the present invention, there is provided a navigation system for a visually impaired user, comprising:

a navigation module arranged to derive a navigational path from a starting position to a predetermined destination;

a guiding vehicle arranged to guide the visually impaired user towards the predetermined destination based on the derived navigational path whereby the movement is arranged to indicate a navigation guidance to the visually impaired user;

wherein the navigation module is further arranged to adjust the navigational path of the guiding vehicle in response to the detection of an obstacle during the navigation of the guiding vehicle so as to avoid the detected obstacle whilst following the navigational path.

In accordance with the first aspect, the navigation module is arranged to detect one or more dimensions of the obstacle adjacent to the guiding vehicle.

In accordance with the first aspect, the navigation module is arranged to determine a safety zone without the presence of detected obstacle.

In accordance with the first aspect, further comprising an obstacle sensing module arranged to detect the obstacle presented in the derived navigational path during the navigation whereby the navigation module is arranged to receive the signal associated with the detection of the obstacle from the obstacle sensing module.

In accordance with the first aspect, the obstacle sensing module further includes a depth camera arranged to capture a three-dimensional image viewing from the guiding vehicle.

In accordance with the first aspect, the obstacle sensing module further includes a LiDAR arranged to capture a full angle planar view representing the location of the obstacles relative to the guiding vehicle.

In accordance with the first aspect, the obstacle sensing module is movable together with the guiding vehicle.

In accordance with the first aspect, further comprising a user control module arranged to receive an input associated with a predetermined destination.

In accordance with the first aspect, further comprising a signal communication module arranged to communicate signal between the navigation module and the user control module embedded in a handheld device.

In accordance with the first aspect, wherein the navigational path is derived based on a pre-recorded navigational path stored in a storage device.

In accordance with the first aspect, wherein the guiding vehicle includes a base movable by one or more wheels, each wheel being driven by a corresponding servo motor.

In accordance with the first aspect, further including an odometry sensor arranged to determine the position of each wheel whereby the navigation module is arranged to determine the current position of the guiding vehicle relative to the predetermined destination.

In accordance with the first aspect, wherein the guiding vehicle further includes a handle portion extending from the base whereby the visually impaired user in use is in a physical contact with vehicle through the handle portion.

In accordance with the first aspect, wherein the handle portion further includes a touch sensing unit arranged to receive an input associated with an instruction from the visually impaired user.

In accordance with the first aspect, wherein the handle portion further includes vibration means arranged to provide at least one of haptic and sound feedback representative of an event to the visually impaired user through the physical contact between the visually impaired user and the guiding vehicle.

In accordance with a second aspect of the present invention, there is provided a method of navigating a visually impaired user, comprising the steps of:

deriving a navigational path for a guiding vehicle based on one or more parameters;

guiding the visually impaired user towards the predetermined destination by the guiding vehicle based on the derived navigational path whereby the movement is arranged to indicate a navigation guidance to the visually impaired user;

receiving a further signal associated with the detection of an obstacle during the navigation of the guiding vehicle; and adjusting the navigational path of the guiding vehicle in response to the detection of the obstacle during the navigation of the guiding vehicle so as to avoid the detected obstacle whilst following the navigational path.

In accordance with the second aspect, further comprising the steps of:

receiving further signal associated with the detection of a further obstacle during the navigation of the guiding vehicle based on the adjusted navigational path of the guiding vehicle; and further adjusting the adjusted navigational path of the guiding vehicle in response to the signal associated with the detection of the obstacle during the navigation of the guiding vehicle so as to avoid the detected further obstacle.

In accordance with the second aspect, further comprising the step of recording the actual navigational path of the guiding vehicle.

In accordance with the second aspect, wherein the navigational path is derived based on the recorded actual navigational path in a previous navigation.

In accordance with the second aspect, further comprising the step of presenting at least one of haptic and sound feedback representative of an event to the visually impaired user through the physical contact between the visually impaired user and the guiding vehicle.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

The inventors have devised a safer walking guidance system for visually impaired persons, which combines guide dog functionality with user targeted destination. The system includes a navigation control module and a guidance mini robot for obstacle avoidance and implement walking commands. Accordingly, such a new road guidance tool can improve the convenience of a visually impaired user. For the purpose of this document, the term "visually impaired persons or users" may include those with visual impairment, partial visual impairment, or persons with one or more various sensory challenges or cognitive impairments that may prevent such persons from seeing processing, understanding or interacting with their environments. Such persons may have visual impairments, hearing impairments, sensory impairments or physical or mental impairments or illness that may prevent them from navigating around an environment.

Figure 1:
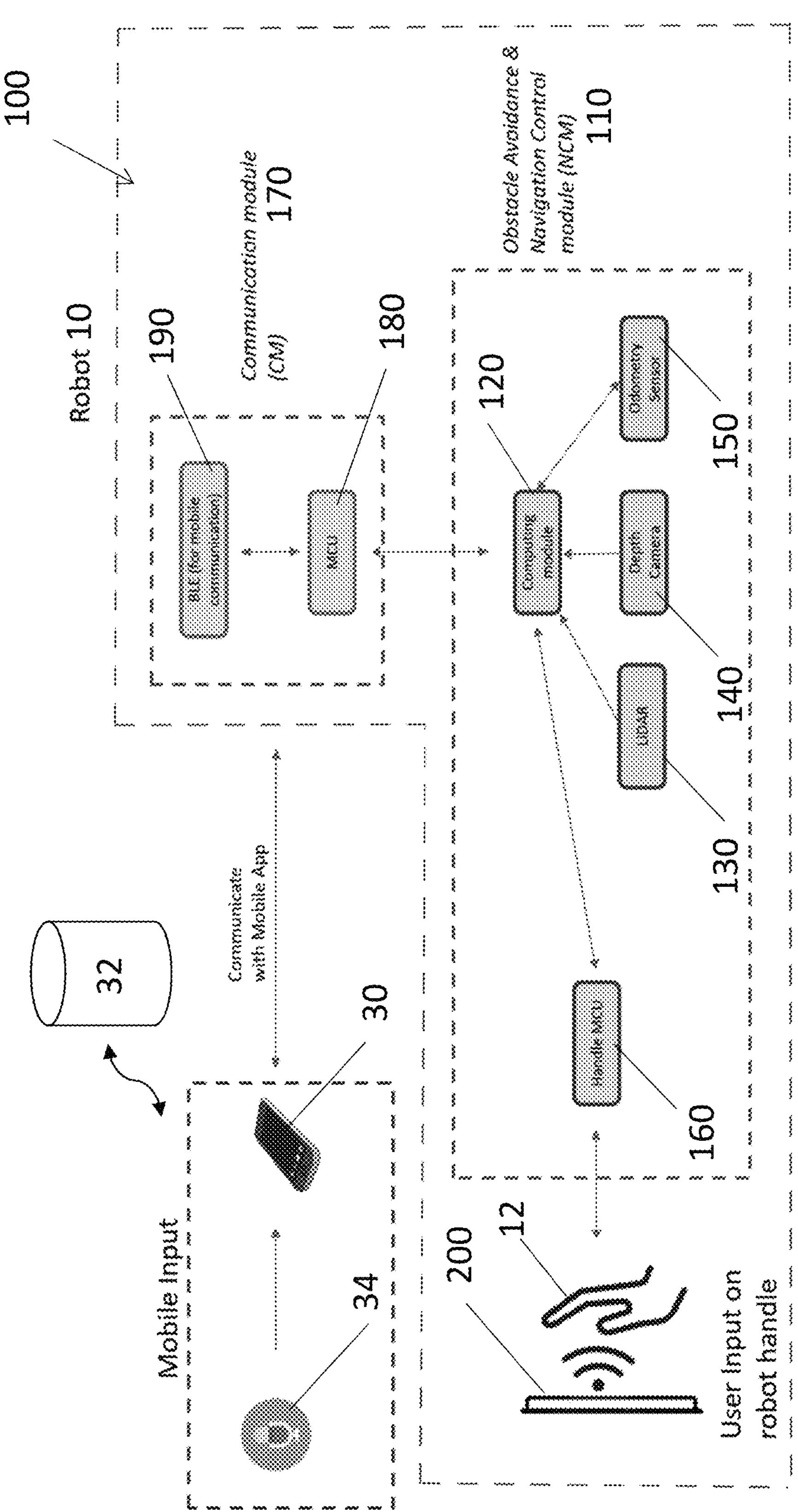
FIG. 1 is a block diagram of a navigation system in accordance with an embodiment of the present invention.

With reference to FIG. 1, there is shown an embodiment of a navigation system 10 for a visually impaired user, comprising: a navigation module 110 arranged to derive a navigational path from a starting position to a predetermined destination; a guiding vehicle 200 arranged to guide the visually impaired user towards the predetermined destination based on the derived navigational path whereby the movement is arranged to indicate a navigation guidance to the visually impaired user; wherein the navigation module 110 is further arranged to adjust the navigational path of the guiding vehicle 200 in response to the detection of an obstacle during the navigation of the guiding vehicle 200 so as to avoid the detected obstacle whilst following the navigational path.

For the purposes of this document, the term "obstacle" includes any type of obstacles, such as, but not limited to, human, animal, plant, object with regular or irregular shape, an area or a zone, overhead object, wall, pit which may obstruct the navigation path of a guiding vehicle or a visually impaired user. The term "obstacle" also includes both any stationary and moving obstacles.

As shown in FIG. 1 there is a shown a schematic diagram of a navigation system 10 and a user 12 e.g. a visually impaired user interacting with the system 10. The navigation system 10 can be embodied as a guiding vehicle 200 in which a computing apparatus 100 is embedded. In addition, an additional computing apparatus 30 in signal communication with the guiding vehicle 200 is also provided for communicating one or more inputs associated with the destination information to the navigation system 10.

Referring to FIG. 1 for the further details of the overall architecture of the navigation system 10 in accordance with one example embodiment of the present invention. Essentially, the computing apparatus 100 comprises a navigation module 110 for providing navigational direction to the guiding vehicle 200. The navigation module 110 can calculate a navigational path from current location to the destination and control the movement of the guiding vehicle 200 towards the destination. The navigation module 110 can also control the guiding vehicle 200 to avoid obstacles in front of the guiding vehicle 200 in real time.

Preferably, the navigation module 110 is embedded within the guiding vehicle 200 and movable together with the guiding vehicle 200. The navigation module 110 includes an Obstacle Avoidance and Navigation Control module (NCM) for processing the sensor data associated with obstacles around the guiding vehicle 200 and determining the turning angle and speed of the guiding vehicle 200. For instance, the navigation module 110 further includes a computing module 120, a Light Detection and Ranging (LIDAR) module 130, a depth camera 140 and an odometry sensor 150.

The computing module 120 includes suitable components necessary to receive, store and execute appropriate computer instructions. The components may include a processing unit, including Central Processing United (CPUs), Math Co-Processing Unit (Math Processor), Graphic Processing United (GPUs) or Tensor processing united (TPUs) for tensor or multi-dimensional array calculations or manipulation operations, read-only memory (ROM), random access memory (RAM), and input/output devices such as disk drives, a user interface such as a keyboard, touchscreen. The processing unit may be a single processor to provide the combined functions of multiple processors. In this example embodiment, the computing module 120 is configured to receive data associated with the apparatus 10 and the environment measured by external sensing units.

The Obstacle Avoidance and Navigation Control module (NCM) 110 may further comprises one or more sensing units to capture a plurality of images or capture a video stream within a predetermined time period. Preferably, the sensing unit may be mounted on the guiding vehicle 200 such that the sensing unit can capture images or video of the objects proximate to the guiding vehicle 200. The sensing unit is arranged in signal communication with the processing unit of the computing module 120 such that the computing module 120 is configured to receive recorded images or video from the sensing unit and process the images or video in real time.

For instance, there is provided an optical surveying module 130 which is operable to generate a virtual map representative of the obstacles proximate to the guiding vehicle 200. In addition, there is also provided an image capturing module 140 which is operable to capture images of distant objects relative to the guiding vehicle 200.

In one example embodiment, the optical surveying module 130 can be a 2D LiDAR sensing unit 130 which measures distance to obstacles by illuminating the obstacle with lasers and analyzing the reflected lasers. For instance, the LiDAR sensing unit 130 is arranged to emit a laser beam with a pulse based on a spin movement and collect horizontal distance to the obstacles to retrieve data in X and Y axe. This will obtain a full angle 360° planar view of the guiding vehicle 200 with respect to a vertical Z axis. The 360° planar view is subsequently processed by the computing module 120 to detect adjacent obstacles and wall. Accordingly, the computing module 120 can process the 360° data to plan a safe path for traveling by the guiding vehicle 200.

In one example embodiment, the image capturing module 140 can be a depth camera 140. For instance, the depth camera 140 is arranged to capture a frontal 3D view of the guiding vehicle 200 so as to measure the distance between the guiding vehicle 200 and one or more obstacles ahead. The frontal 3D view is subsequently processed by the computing module 120 to detect objects with irregular shape and to determine a safety zone ahead to be travelled by the guiding vehicle 200. Moreover, the computing module 120 can also determine the height of the overhead objects and avoid obstacles at head height.

Additionally, the obstacle avoidance and navigation control module (NCM) 110 may further include an odometry module which includes one or more odometry sensors 150 to detect the rotational displacement of the wheels of the guiding vehicle 200. For instance, the odometry sensor 150 may include one or more encoder sensors arranged to detect a rate of rotation of one or more wheels of the guiding vehicle 200.

For instance, the encoder may track the number or rotations made by each wheel of the guiding vehicle 200 and transmit the data to the computing module 120. Preferably, the odometry module may communicate with the one or more encoder sensors disposed onto each driving motor to determine the distance and direction travelled of each wheel, and in turn transmit the rotation distance and the direction of rotation of each wheel to the computing module 120. By calculating the motor rotations, gearbox ratio, i.e., the transmission ratio, and outer diameter of the wheels, the computing module 120 can process and determine the rotation distance travelled by each wheel and the position of the guiding vehicle 200 relative to the starting point and destination.

Advantageously, the computing module 120 may calibrate the data obtained from various sensing units and detect the discrepancies therebetween. For instance, the wheels of the guiding vehicle 200 have travelled some extra rotation distances due to an uneven surface, and the odometry sensor 150 may have tracked that the guiding vehicle 200 has travelled to a particular co-ordinate on a virtual map which at a distance substantially far away from the co-ordinates and real time navigation information obtained from the LiDAR sensing unit 130 and the depth camera 140. The computing module 120 can determine that the co-ordinates of the odometry sensor 150 is abnormal and are inconsistent with the navigation information from the LiDAR sensing unit 130 and the depth camera 140. The computing module 120 may in turn rectify the error caused by the odometry sensor 150 and calibrate the current position of the guiding vehicle 200.

The computing apparatus 100 may also comprise other input devices such as an Ethernet port, a USB port, etc. Display such as a liquid crystal display, a light emitting display or any other suitable display and communications links (i.e., a communication interface). For instance, the Obstacle Avoidance and Navigation Control module (NCM) 110 may further include a Microcontroller (MCU) 160 for signal communication with the handle portion on the guiding vehicle 200.

The computing module 120 may include instructions that may be included in ROM, RAM, or disk drives and may be executed by the processing unit. There may be provided with one or more communication interfaces (i.e., one or more communication links) which may variously connect to one or more computing devices such as a server, personal computers, terminals, wireless or handheld computing devices, Internet of Things (IoT) devices, smart devices, edge computing devices. At least one of a plurality of communications link may be connected to an external computing network through a telephone line or other type of communications link. The communication interface is configured to allow communication of data via any suitable communication network using any suitable protocol such as for example Wi-Fi, Bluetooth, 4G, 5G or any other suitable protocol.

In one example embodiment, the communication interface can be a Communication Module (CM) 170 which is arranged to communicate with the Obstacle Avoidance and Navigation Control module (NCM) 110. The Communication Module (CM) 170 is also arranged to communicate with the additional computing apparatus 30. Thus, the Communication Module (CM) 170 is a bridge between the computing apparatus 30 and the Obstacle Avoidance and Navigation Control module (NCM) 110.

For instance, the Communication Module (CM) 170 may include two key units: a Microcontroller (MCU) 180 and a Bluetooth (BLE) communication module 190. The Microcontroller (MCU) 180 is arranged to control and coordinate with the Obstacle Avoidance and Navigation Control module (NCM) 110 while the BLE modules 190 is arranged to process the Bluetooth (BLE) communication with the computing apparatus 30. In particular, the MCU 180 controls the sleep and wakeup cycle for communication with various modules. The BLE data received from various modules will be handled to generate the communication protocol and provide an interface to handle an event from the Obstacle Avoidance and Navigation Control module (NCM) 110. The BLE communication module 190 is arranged to communicate between the computing apparatus 30 and the Obstacle Avoidance and Navigation Control module (NCM) 110. The BLE communication module 190 handles the BLE packet to the microcontroller 180.

In one example embodiment, the computing apparatus 30 may be a handheld computing device such as a tablet, smartphone, laptop or other personal computing device. The computing apparatus 30 may execute an application (app) to implement the various functions defined by the application. In particular, the computing apparatus 30 includes a software application (i.e., an app) that is stored in a memory unit e.g., ROM or RAM or another memory unit. The software application includes computer readable and executable instructions. The computing apparatus 30 is configured to execute the instructions to cause the processor to perform one or more functions defined in the instructions. For instance, the application may control the processor to provide one or more navigation path planning functions.

Referring to the example embodiment of FIG. 1, the computing apparatus 30 is a handheld computing device e.g., a smartphone preinstalled with a Navigation Mobile App for accessing to the navigation system 10 once executed. The smartphone 30 comprises a location database 32 that stores map data e.g. location information regarding a plurality of destination with respect to a virtual map. For instance, the location database 32 may store a pre-build map and a plurality of destination IDs related to one or more corresponding locations on the pre-build map. The smartphone 30 also includes a BLE communication module for communicating with the BLE communication module 190 of the computing apparatus 100.

Preferably, the smartphone 30 may also comprise a sound sensing unit 34 e.g., a microphone which captures the sound data associated with the interaction between the user and the apparatus 10. The smartphone 30 may also include a speaker unit for providing audible information to the user.

In use, the smartphone 30, upon running the navigation mobile app, is paired with the guiding vehicle 200 via Bluetooth connection with the Communication Module (CM) 170 and a user can execute the software application to access the system 10 and input one or more commands via the software application. For instance, the user can input a target destination via speech and the smartphone 30 will convert the voice input into destination ID and send the corresponding destination ID to the guiding vehicle 200 though NCM 110. Once the guiding vehicle 200 has reached the destination, the smartphone 30 may alert the user with voice through the speaker unit or vibration on the handle portion of the guiding vehicle 200.

Figures 2A, 2B:
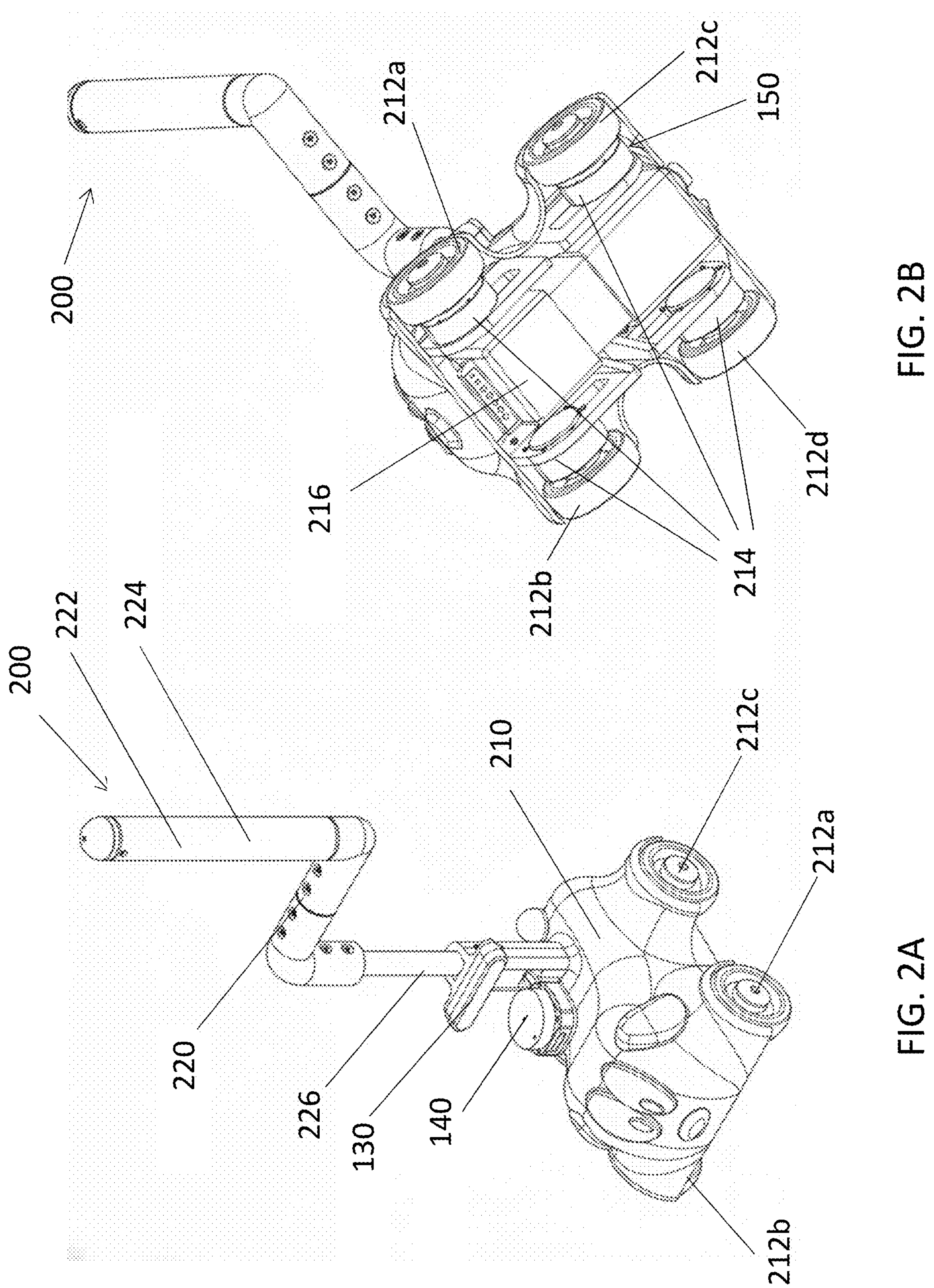
FIG. 2A shows a top perspective view of a guiding robot of a navigation system in accordance with an embodiment of the present invention.
FIG. 2B shows a bottom perspective view of a guiding robot of a navigation system in accordance with an embodiment of the present invention.

With reference now to FIGS. 2A to 2B, there is a shown one example embodiment of a navigation system 10 of FIG. 1 in which at least some electronic components such as NCM 110 are embedded as part of the guiding robot 200.

In this embodiment, the guiding robot 200 may be a guiding vehicle or a guide dog. The guiding vehicle 200 comprises two essential parts: a base 210 and a handle 220 extending from the base 210. Preferably, a plurality of sensors for object avoidance and scene analysis are placed onto the base 210 while one or more user communicating interfaces are placed onto the handle 220. Preferably, the LiDAR module 130 and the depth camera 140 are positioned externally on the casing of the base 210 and exposed to the environment. The LiDAR module 130 and the depth camera 140 are each positioned at an elevated position relative to the ground without being visually obstructed. The depth camera 140 is positioned at a further elevated position relative to the LiDAR module 130.

The guiding vehicle 200 has a vehicle body 210 with a pair of front wheels 212*a*, 212*b* and a pair of rear wheels 212*c*, 212*d* each operably connected to the vehicle body 210, to drive the guiding vehicle 200 along a surface. The front wheels 212*a*, 212*b* and rear wheels 212*c*, 212*d* are each motorized by a respective servo motor 214 such that the four wheels 212*a*, 212*b*, 212*c*, 212*d* may be steered in different angles for turning around a corner or an obstacle.

Preferably, there is also provided one or more gearbox arrangements (not shown) between the wheels 212*a*, 212*b*, 212*c*, 212*d* and the servo motor 214 for the mechanical transmission of the rotational force to the wheels 212*a*, 212*b*, 212*c*, 212*d* from the servo motor 214. Optionally, the front wheels 212*a*, 212*b* can be mechanically connected to a first gearbox while the rear wheels can be mechanically connected to a second gearbox for operating different gearbox ratios.

The guiding vehicle 200 includes a battery module 216 for providing power supply to the servo motors 214. When the servo motors 214 are energized by the battery module 216, for instance upon receiving an instruction from the user via the handle 220, the servo motors 214 will rotate and in turn actuate the wheels 212*a*, 212*b*, 212*c*, 212*d* via the gearbox.

Preferably, there is also provided one or more brakes (not shown) for interrupting the rotation of each of the wheels 212*a*, 212*b*, 212*c*, 212*d* in the event that there is an emergency. For instance, if the computing module 120 determines that the distance between the guiding vehicle 200 and an approaching obstacle exceeds a predefined threshold value and it is not possible to avoid collision merely by steering in a different angle and a progressive deceleration, the wheels 212*a*, 212*b*, 212*c*, 212*d* may be stopped by brakes immediately to avoid hitting the obstacle.

With reference to FIG. 2 again, there is illustrated an example of odometry sensors 150 in FIG. 1 arranged to be implemented into the guiding vehicle 200. In this example embodiment, the odometry sensors 150 are implemented into each of the servo motors 214 actuating the respective front and rear wheels 212*a*, 212*b*, 212*c*, 212*d* of the guiding vehicle 200. The odometry sensor 150 is arranged to measure the number of rotations of the front and rear wheels 212*a*, 212*b*, 212*c*, 212*d* to which odometry sensor 150 is implemented to operate with. In turn, the processing unit of the computing module 120 can estimate the distance travelled by the guiding vehicle 200 based on the detected number of rotations of each respective wheels 212*a*, 212*b*, 212*c*, 212*d*, the corresponding gearbox ratio of the gear arrangement and the circumference of the wheels 212*a*, 212*b*, 212*c*, 212*d*.

In one example embodiment, the odometry sensor 150 includes an encoder sensor for determining the rotational position of the servo motor 214 accurately and determine relative motion of the wheels 212*a*, 212*b*, 212*c*, 212*d*. For instance, one or more encoder may be disposed onto the motor housing of each servo motor 214 and a magnetic component may be disposed onto the shaft of the servo motor 214 preferably adjacent to the encoder sensors. Accordingly, the encoder sensor may determine the angular movement of the adjacent magnetic component.

In addition, the guiding vehicle 200 may also be steered in different angles for turning around a corner or an obstacle. To achieve this, the opposing left and right wheels of at least one pair of wheels 212*a*, 212*b* and 212*c*, 212*d* may be driven by two individual servo motors 214 such that the opposing wheels can spin in different rotation speeds or opposite directions. Accordingly, the computing module 210 can determine the direction and rate of turn of the guiding vehicle 200 along a surface based on the differentiation of the rotation speeds measured by each of the odometry sensors 150.

In this example embodiment, the guiding vehicle 200 also includes a handle 220 which may be held by a user, such that the guiding vehicle 200 may navigate and guide the user to move from one position to another. Preferably, the handle 220 may also be arranged to allow the user to provide a travel instruction to the guiding vehicle 200 so as to travel a predetermined path and/or to provide information associated with a detection of obstacle to the user.

The handle 220 may further includes a holding portion 222 which is embedded with a touch sensor or button 224. The handle 220 may include a vibration motor to provide a haptic and sound feedback to raise alert and to serve as a control panel to give commands such as start and stop. Upon receiving the alert from the holding portion 222, the user may tap the touch sensor or button 224 to send an instruction to the guiding vehicle 200. For instance, a single tapping by the user may indicate a confirmation to a request by the Microcontroller (MCU) 160 while a quick double tapping by the user may indicate a cancellation of a request by the Microcontroller (MCU) 160.

Preferably, the handle 220 may further include an elongated shaft 226 such that the holding portion 222 becomes more accessible to a visually impair user from the ergonomic perspective. Optionally, the elongated shaft 226 is retractable such that the elevated position of the holder portion 222 can be adjusted to suit users with different height.

Figure 6:
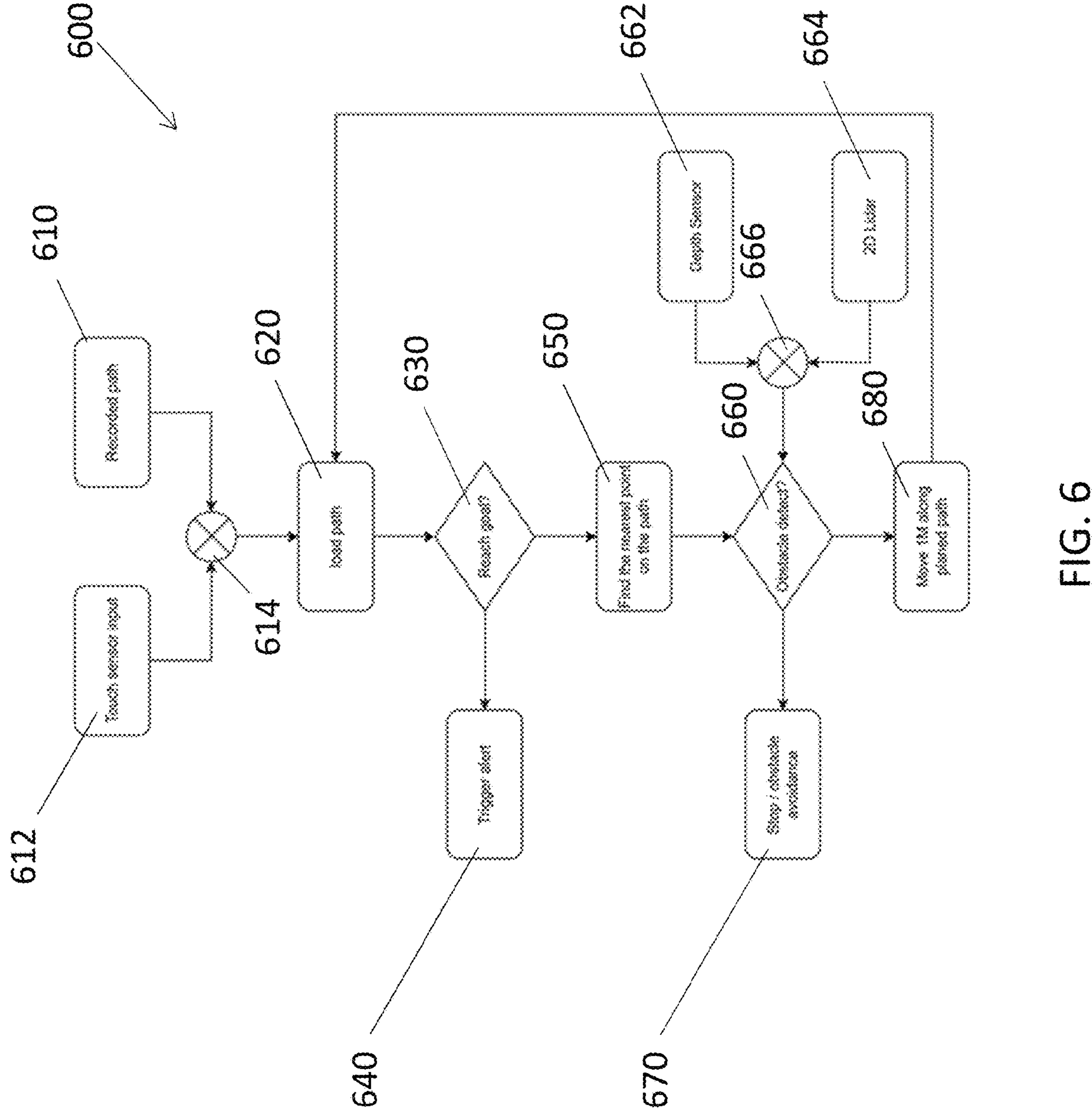
FIG. 6 is a schematic diagram showing the operation workflow of the navigation system of FIG. 5, with the implementation of a Multimodal Sensing Priority Management and Handling algorithm.

The navigation system 10 in accordance with one example embodiment of the present invention can be operated in at least two different operation modes, a navigation mode (FIGS. 3 and 4) and a training mode i.e., a path follow mode (FIG. 6). The navigation mode can navigate the user to a preset destination while the training mode can train a new user to learn how to use the road guidance robot of the present invention.

Figure 3:
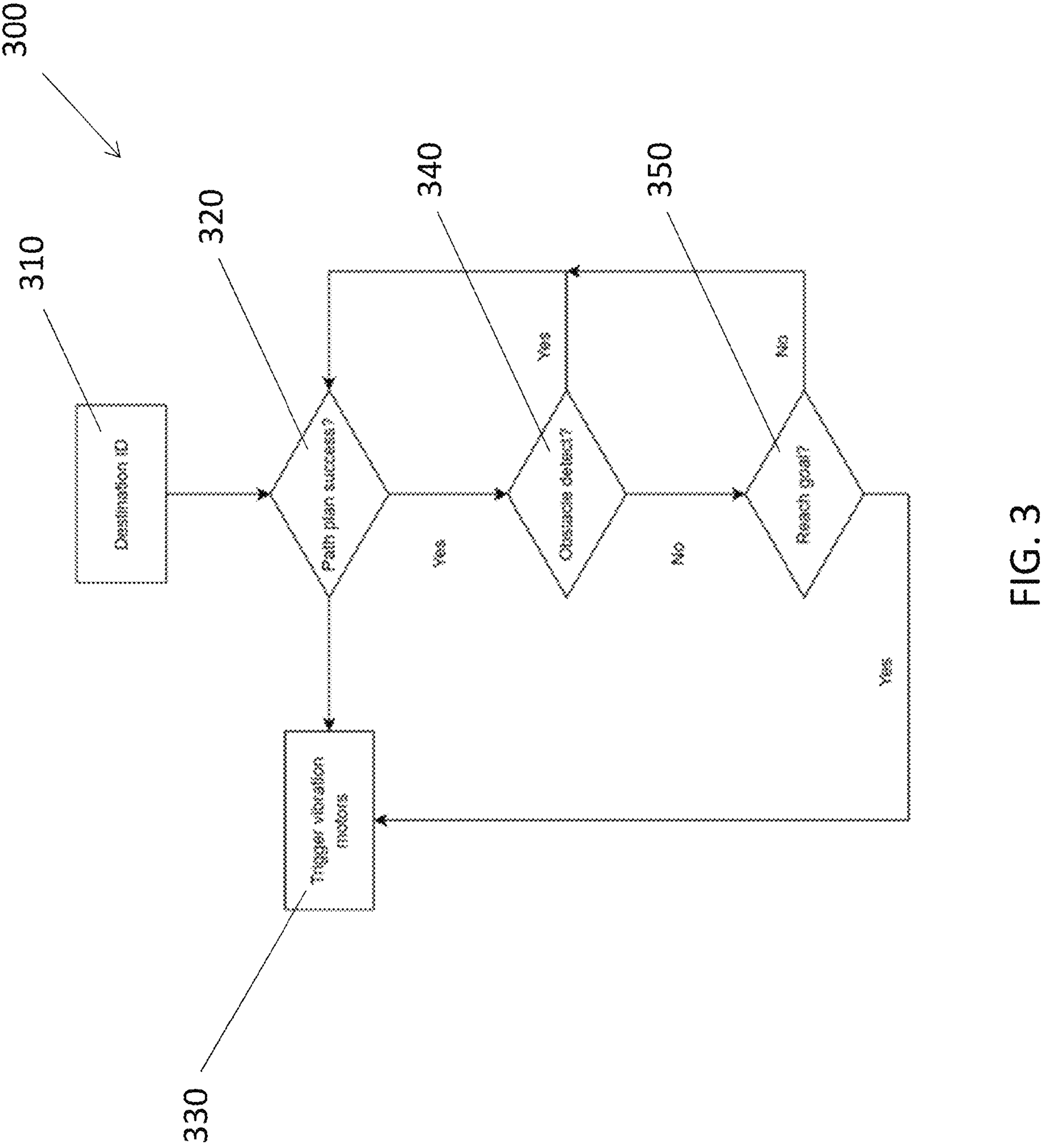
FIG. 3 is a schematic diagram showing the operation workflow of the navigation system of FIG. 1.

With reference to FIG. 3, there is shown an embodiment of a method 300 of navigating a visually impaired user 12, comprising the steps of: deriving a navigational path for a guiding vehicle 200 based on one or more parameters; guiding the visually impaired user 12 towards the predetermined destination by the guiding vehicle 200 based on the derived navigational path whereby the movement is arranged to indicate a navigation guidance to the visually impaired user 12; receiving a further signal associated with the detection of an obstacle during the navigation of the guiding vehicle 200; and adjusting the navigational path of the guiding vehicle 200 in response to the detection of the obstacle during the navigation of the guiding vehicle 200 so as to avoid the detected obstacle whilst following the navigational path.

The operation mode of one example embodiment of system 10 is now further described with reference to FIGS. 3 and 4.

In the navigation mode, the user can input a preset destination from a mobile app preinstalled on the smartphone 30 as shown in FIG. 1. User can input the destination by the user interface of the mobile app or by voice. The mobile app connects to the guiding vehicle 200 through Bluetooth communication. The destination will be sent to the guiding vehicle 200, and the guiding vehicle 200 will move to the destination along a planned navigational path.

Referring to FIG. 3, the method 300 begins with step 310. Step 310 comprises inputting a destination ID by the user through the smartphone 30. The guiding vehicle 200 receives the destination and wait for user input signal from handle 220 to confirm. Upon receiving the confirmation signal, the guiding vehicle 200 will find the destination point on the pre-build map. Step 320 comprises deriving a navigational path for a guiding vehicle 200 based on one or more parameters. If the destination is found on the map, the guiding vehicle 200 will plan a navigational path to the destination. Step 330 comprises alerting the user through the touch sensor or button 224 on the handle 220. If the destination is not found on the map, the guiding vehicle 200 will trigger the vibration motor on the holding portion 222 to alert the user. Step 340 comprises detecting one or more obstacles during the navigation of the guiding vehicle 200. If an obstacle is detected on the navigational path, the guiding vehicle 200 will repeat step 320 and replans a path to avoid obstacle. Otherwise, the guiding vehicle 200 will move along the path and go to destination. Step 350 comprises determining the current position of the guiding vehicle 200 relative to the preset destination. If the guiding vehicle 200 reaches the goal, the guiding vehicle 200 will trigger the vibration motor on the holding portion 222 to alert the user and report the arrival through the mobile app (step 330). Otherwise, the guiding vehicle 200 will repeat step 320 and plan another path to the destination again.

In some scenarios, the planned navigational path is too ideal and some obstacles are absent from the virtual map. The planned navigation path is not realistic and has to be timely refined to avoid any collision with obstacles in the real world.

In one embodiment, there is provided an object avoidance and scene analysis algorithm. The way finding solution includes a vision module for object detection, obstacle avoidance, path planning. Initially, a frontal 3D view of the guiding vehicle 200 is captured by a depth camera 140. The view is used to detect objects with irregular shape and to determine a safety zone ahead to travel. Moreover, it is used to determine the height of the overhead objects and avoid obstacles at head height. Subsequently, a 360 planar view is obtained by a 2D LiDAR 130. The view is used to detect obstacles and wall. The 360 data is used to plan a safe path to travel.

In one alternative embodiment, there is also provided a Multimodal Sensing Priority Management and Handling algorithm, in which various data are captured and computed by the computing module 120 with different priorities. For instance, the computing module 120 can process to determine a global planner and subsequently refined with a local planner in real time.

Initially, the computing module 120 may process to derive a moving instruction i.e., path plan for guiding the user from the current position to the destination through the full path. The computing module 120 will then adjust the planned full path based on the information from a local map generated by the obstacle avoidance analysis module 110. In particular, the obstacle avoidance analysis module 110 receives the information from LiDAR 130 and the Depth camera 140 to detect any obstacle that near the guiding vehicle 200. The guiding vehicle 200 will then adjust its planned path based on an obstacle avoidance algorithm.

For instance, an elastic band such as a deformable collision free path is initially formed by the global planner. Based on the real time simulation captured by the LiDAR 130 and Depth camera 140, the collision free path will be further adjusted locally by the navigational module 110. For instance, an initial shape of the elastic band would be reduced into a shorter and smoother path that maintains sufficient clearance from the detected obstacles. During the navigation move of the guiding vehicle 200, user can also set another destination on the map and the guiding vehicle 200 will replan a new path to reach the destination.

Figure 4:
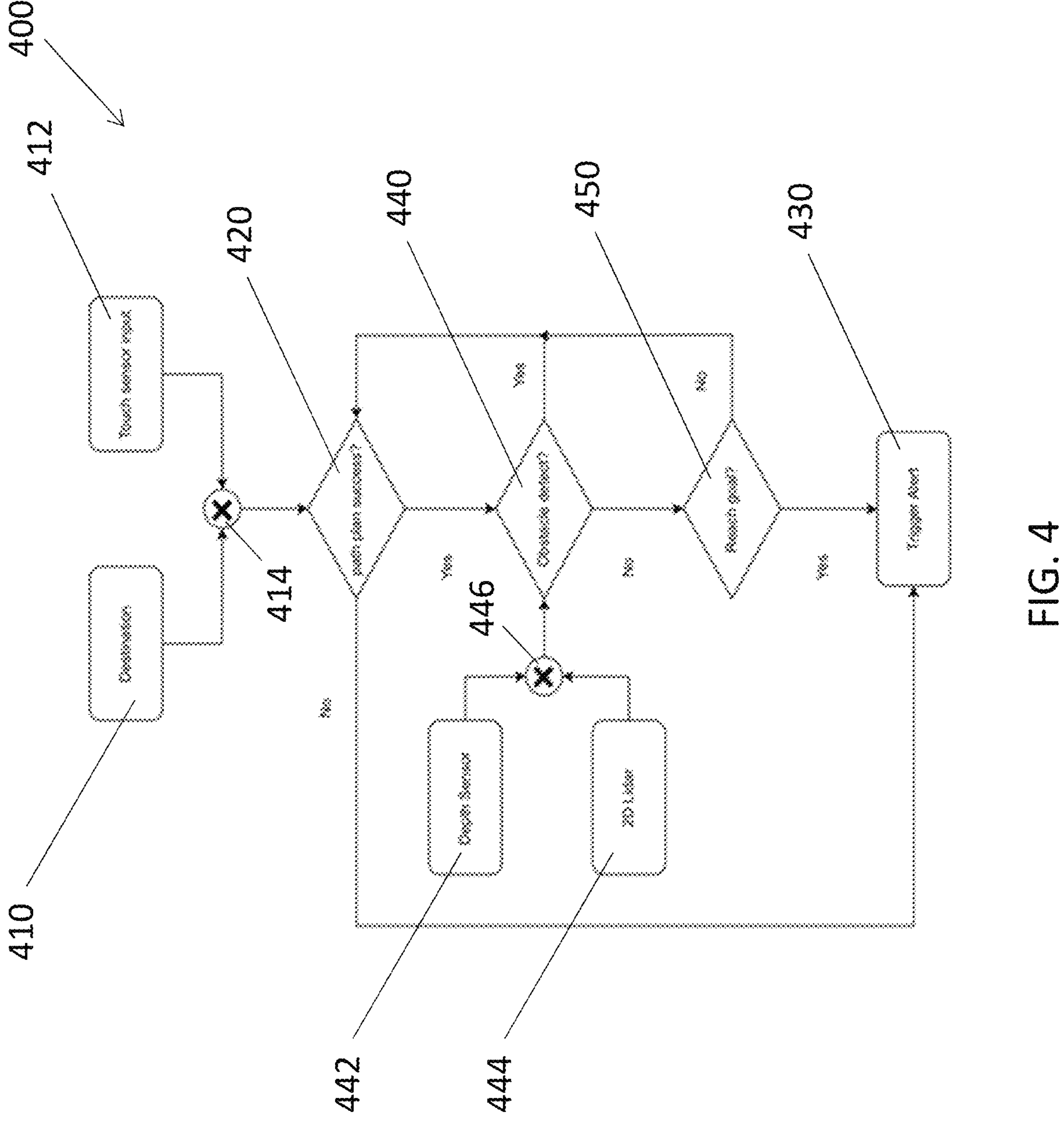
FIG. 4 is a schematic diagram showing the operation workflow of the navigation system of FIG. 1, with the implementation of a Multimodal Sensing Priority Management and Handling algorithm.

Referring to FIG. 4, the method 400 begins with step 410. Step 410 comprises inputting a destination ID by the user through the smartphone 30. The guiding vehicle 200 receives the destination and wait for user input signal from handle 220 to confirm. Step 412 comprises receiving a touch sensor input from the handle 220. Step 414 comprises receiving both of the destination ID and the confirmation signal. The guiding vehicle 200 will find the destination point on the pre-build map. Step 420 comprises deriving a navigational path for a guiding vehicle 200 based on one or more parameters. If the destination is found on the map, the guiding vehicle 200 will plan a navigational path to the destination. Step 430 comprises alerting the user. If the destination is not found on the map, the guiding vehicle 200 will trigger an alert to inform the user through the handle 220 or the smartphone 30.

Step 440 comprises detecting one or more obstacles during the navigation of the guiding vehicle 200. In this example embodiment, the detection of obstacle is achieved by processing data received various sensors such as depth camera 140 and 2D LiDAR 130. Step 442 comprises capturing the frontal 3D view of the guiding vehicle 200 by the depth camera 140. Step 444 comprises detecting a 360 planar view by the 2D LIDAR 130. Step 446 comprises estimating the position and dimension of the obstacles based on the data captured by the 2D LiDAR 130 and the depth camera 140. If an obstacle is detected on the navigational path, the guiding vehicle 200 will repeat step 420 and replans a path to avoid obstacle. Otherwise, the guiding vehicle 200 will move along the path and go to destination. Step 450 comprises determining the current position of the guiding vehicle 200 relative to the preset destination. If the guiding vehicle 200 reaches the goal, the guiding vehicle 200 will trigger an alert to inform the user and report the arrival through the mobile app (step 430). Otherwise, the guiding vehicle 200 will repeat step 420 and plan another path to the destination again.

Figure 5:
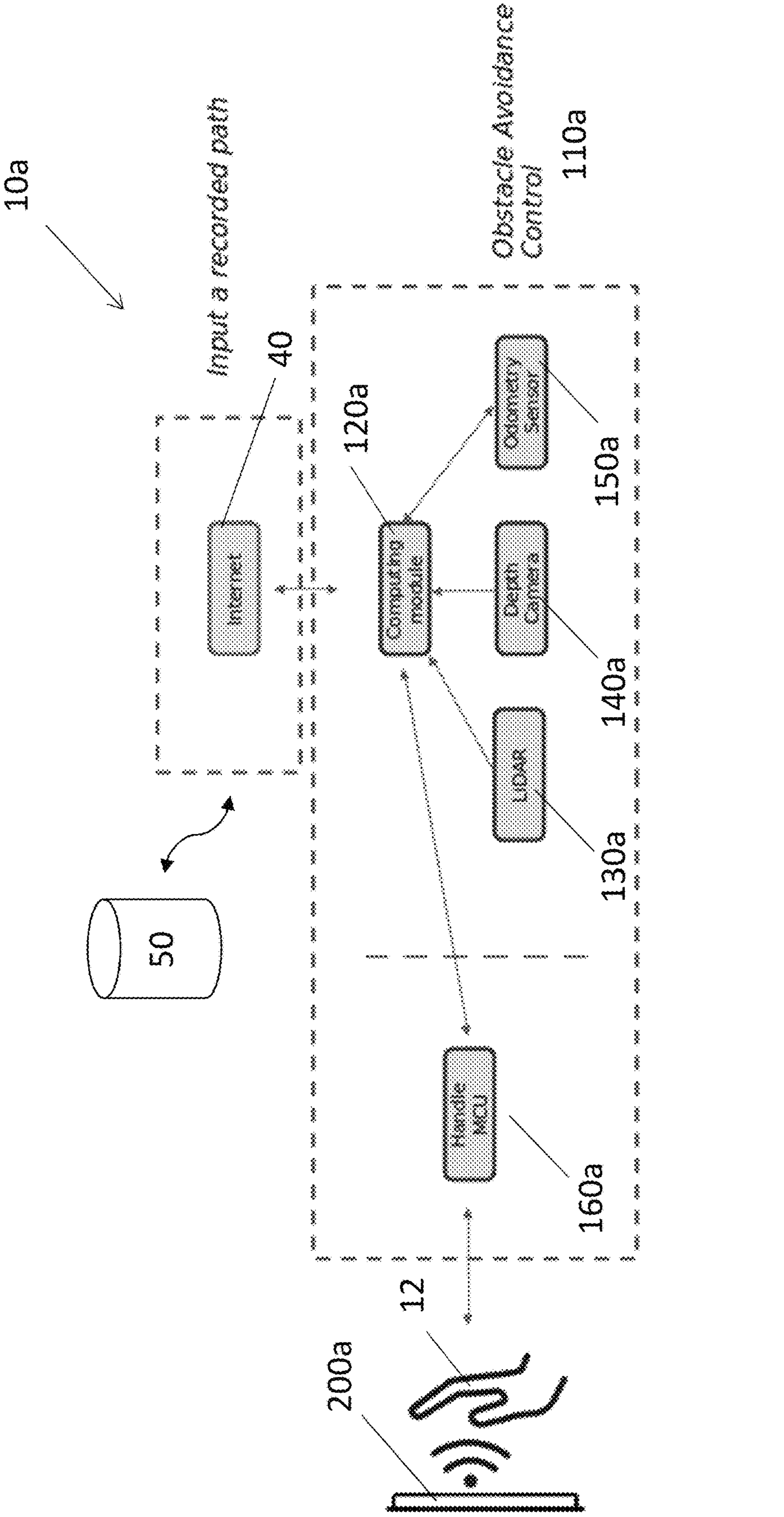
FIG. 5 is a block diagram of a navigation system in accordance with an alternative embodiment of the present invention.

Referring to FIG. 5 for the further details of the overall architecture of the navigation system 10*a* in accordance with an alternative embodiment of the present invention. Essentially, the navigation system 10*a* includes a navigation module 110*a* which functions similar to the navigation module 110 of FIG. 1 and embedded into a guiding vehicle 200. The navigation module 110*a* includes major components such as a computing module 120*a*, a LIDAR module 130*a*, a depth camera 140*a*, an odometry sensor 150*a* and a Microcontroller (MCU) 160*a*, each functioning similar to the corresponding components of navigation system 10 of FIG. 1.

However, in this example embodiment, the default navigational path is not computed by the computing module 120*a*. Neither does the navigation system 10*a* include a Microcontroller (MCU) 170 and a Bluetooth (BLE) communication module 180. Rather, the computing module 120*a* may be in a signal communication with a remote storage or server 50 through the internet 40. For instance, the computing module 120*a* may load a prerecorded navigational path from the remote storage or server 50 through the internet 40. The navigational path is further refined based on the real-time reading of the LiDAR module 130*a* and the depth camera 140. Preferably, the refined navigation path is recorded by the navigation module 110*a* and uploaded to the remote storage or server 50 for future references.

The operation mode of one example embodiment of system 10*a* is now further described with reference to FIG. 6.

In the path follow mode, the user can set a fix navigational path that the guiding vehicle 200 will follow the path to move. Meanwhile, the server 50 will record the moving path of the guiding vehicle 200. The guiding vehicle 200 may load a stored path locally or download the recorded path from remote storage or server 50. The guiding vehicle 200 will follow the path to move when the user trigger the touch sensor or button 224.

Referring to FIG. 6, the method 600 begins with step 610. Step 610 comprises receiving a recorded path through the internet 40. The guiding vehicle 200 receives destination and wait for user input signal from handle 220 to confirm. Step 612 comprises receiving a touch sensor input from the handle 210. Step 614 comprises receiving both of the recorded path and the confirmation signal. The guiding vehicle 200 will issue a command to load the navigational path from the pre-build map. Step 620 comprises loading a navigational path for a guiding vehicle 200 and executing the loaded navigational path until the guiding vehicle 200 reaches the goal. Step 630 comprises determining the current position of the guiding vehicle 200 relative to the preset destination. If the guiding vehicle 200 reaches the goal, the guiding vehicle 200 will alert the user and report the arrival (step 640). If the current position is not the destination the guiding vehicle 200 will determine the nearest point on the navigational path (step 650).

Step 660 comprises detecting one or more obstacles during the navigation of the guiding vehicle 200. In this example embodiment, the detection of obstacle is achieved by processing data received some different sensors such as depth camera 140 and 2D LIDAR 130. Step 662 comprises capturing the frontal 3D view of the guiding vehicle 200 by the depth camera 140*a*. Step 664 comprises detecting a 360 planar view by the 2D LIDAR 130*a*. Step 666 comprises estimating the position and dimension of the obstacles based on the data captured by the 2D LiDAR 130*a* and the depth camera 140*a*. If an obstacle is detected on the navigational path, the guiding vehicle 200 will either stop or replans a navigational path to avoid obstacle (step 670). Step 680 comprises moving a predetermined distance e.g. 1 meter along the planned path. Subsequently, the guiding vehicle 200 will repeat step 620 and execute a loaded navigational path until the guiding vehicle 200 reaches the goal.

Although not required, the embodiments described with reference to the figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include tablet computers, wearable devices, smart phones, Internet of Things (IoT) devices, edge computing devices, standalone computers, network computers, cloud-based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A navigation system for a visually impaired user, comprising:

a navigation module arranged to derive a navigational path from a starting position to a predetermined destination;

a guiding vehicle arranged to guide the visually impaired user towards the predetermined destination based on the derived navigational path whereby movement of the guiding vehicle is arranged to indicate a navigation guidance to the visually impaired user;

wherein the guiding vehicle comprises a handle portion, whereby the visually impaired user in use is in a physical contact with the guiding vehicle through the handle portion;

wherein the handle portion further comprises an elongated shaft connecting the holding portion to a body of the guiding vehicle, and wherein the elongated shaft is retractable such that an elevated position of the holding portion is adjustable relative to the guiding vehicle;

wherein the handle portion comprises a holding portion having a touch sensing unit embedded therein arranged to receive an input associated with an instruction from the visually impaired user;

wherein the holding portion further comprises a vibration motor embedded therein arranged to provide at least one of haptic and sound feedback representative of an event to the visually impaired user through the physical contact between the visually impaired user and the guiding vehicle; and wherein the navigation module is further arranged to adjust the navigational path of the guiding vehicle in response to detecting an obstacle during the navigation of the guiding vehicle so as to avoid the detected obstacle whilst following the navigational path.

2. A navigation system in accordance with claim 1, wherein the navigation module is arranged to detect one or more dimensions of the obstacle adjacent to the guiding vehicle.

3. A navigation system in accordance with claim 1, wherein the navigation module is arranged to determine a safety zone, wherein the safety zone is a zone without the presence of a detected obstacle.

4. A navigation system in accordance with claim 3, further comprising an obstacle sensing module arranged to detect the obstacle presented in the derived navigational path during the navigation whereby the navigation module is arranged to receive a signal associated with the detection of the obstacle from the obstacle sensing module.

5. A navigation system in accordance with claim 4, wherein the obstacle sensing module further includes a depth camera arranged to capture a three-dimensional image viewing from the guiding vehicle.

6. A navigation system in accordance with claim 5, wherein the obstacle sensing module further includes a LIDAR arranged to capture a full angle planar view representing location of the obstacles relative to the guiding vehicle.

7. A navigation system in accordance with claim 6, wherein the obstacle sensing module is movable together with the guiding vehicle.

8. A navigation system in accordance with claim 1, further comprising a controller that receives an input associated with the predetermined destination.

9. A navigation system in accordance with claim 8, further comprising a signal communication module arranged to communicate a signal between the navigation module and the user control, the controller being embedded in a handheld device.

10. A navigation system in accordance with claim 1, wherein the navigational path is derived based on a prerecorded navigational path stored in a storage device.

11. A navigation system in accordance with claim 1, wherein the guiding vehicle includes a base movable by one or more wheels, each wheel being driven by a corresponding servo motor.

12. A navigation system in accordance with claim 11, further including an odometry sensor arranged to determine the position of each wheel whereby the navigation module is arranged to determine the current position of the guiding vehicle relative to the predetermined destination.

13. A navigation system in accordance with claim 1, wherein the guiding vehicle comprises a depth camera arranged to capture a three-dimensional view, and wherein the navigation module is arranged to determine a height of an overhead object based on the three-dimensional view and adjust the navigational path to avoid the overhead object at a head height of the visually impaired user.

14. A navigation system in accordance with claim 1, wherein the guiding vehicle comprises a pair of left wheels and a pair of right wheels, and wherein the guiding vehicle is arranged to steer by driving the pair of left wheels and the pair of right wheels at different rotation speeds or in opposite directions.

15. A method of navigating a visually impaired user, comprising:

deriving a navigational path for a guiding vehicle based on one or more parameters;

guiding the visually impaired user towards the predetermined destination by the guiding vehicle based on the derived navigational path whereby the movement is arranged to indicate a navigation guidance to the visually impaired user;

wherein guiding the visually impaired user comprises maintaining physical contact between the user and a handle portion of the guiding vehicle, wherein the handle portion comprises a holding portion embedded with a vibration motor and a touch sensing unit;

receiving an obstacle detection signal associated with the detection of an obstacle during the navigation of the guiding vehicle;

adjusting the navigational path of the guiding vehicle in response to the detection of the obstacle during the navigation of the guiding vehicle so as to avoid the detected obstacle whilst following the navigational path;

providing haptic feedback to the visually impaired user via the vibration motor in the holding portion in response to the detection of the obstacle;

receiving an input associated with an instruction from the visually impaired user comprising a tapping gesture on the touch sensing unit; and canceling a current navigation request in response to detecting the tapping gesture.

16. A method in accordance with claim 15, further comprising:

receiving the obstacle detection signal associated with the detection of a further obstacle during the navigation of the guiding vehicle based on the adjusted navigational path of the guiding vehicle; and further adjusting the adjusted navigational path of the guiding vehicle in response to the obstacle detection signal associated with the detection of the obstacle during the navigation of the guiding vehicle so as to avoid the detected further obstacle.

17. A method in accordance with claim 16, further comprising recording an actual navigational path of the guiding vehicle.

18. A method in accordance with claim 17, wherein the navigational path is derived based on the recorded actual navigational path in a previous navigation.

* * * * *